(12) United States Patent
Curtis

(10) Patent No.: US 7,138,924 B2
(45) Date of Patent: Nov. 21, 2006

(54) DISTURBANCE DIRECTION DETECTION IN A POWER MONITORING SYSTEM

(75) Inventor: Larry E. Curtis, Murfreesboro, TN (US)

(73) Assignee: Square D Company, Palatine, IL (US)

( * ) Notice: Subject to any disclaimer, the term of this patent is extended or adjusted under 35 U.S.C. 154(b) by 257 days.

(21) Appl. No.: 10/722,280

(22) Filed: Nov. 24, 2003

(65) Prior Publication Data

US 2005/0110646 A1    May 26, 2005

(51) Int. Cl.
*G08B 21/00*    (2006.01)
(52) U.S. Cl. .................. 340/657; 340/310.11; 324/512
(58) Field of Classification Search ................ 340/657, 340/310.01, 664, 310.11; 324/512, 524, 324/522; 702/65
See application file for complete search history.

(56) References Cited

U.S. PATENT DOCUMENTS

| | | | | |
|---|---|---|---|---|
| 4,245,150 | A * | 1/1981 | Driscoll et al. | ................ 377/32 |
| 5,796,259 | A * | 8/1998 | Dickmander | ................ 324/524 |
| 5,808,902 | A * | 9/1998 | Levert et al. | ................ 700/293 |
| 6,360,178 | B1 | 3/2002 | Parsons et al. | ................ 702/65 |
| 6,415,244 | B1 * | 7/2002 | Dickens et al. | ............. 702/187 |

OTHER PUBLICATIONS

A Direction Finder for Power Quality Disturbances Based Upon Disturbance Power and Energy; Anthony C. Parsons, W. Mack Grady, Edward J. Powers and John C. Soward; IEEE Transactions on Power Delivery; vol. 15, No. 3, Jul. 2000.
"Powerlogic® Advanced Power Reliability Solutions," Square D Schneider Electric, brochure, 2000, 3 pages.
"Powerlogic® Circuit Monitor—Series 2000," Class 3020, Square D Schneider Electric, brochure, 3 pages.
"Powerlogic® Power Meter," Class 3020, Square D Schneider Electric, brochure, 1998, 2 pages.
"Powerlogic® Metering & Monitoring Devices," Square D Schneider Electric, brochure, 2000, 2 pages.
"Powerlogic® Power Monitoring and Control System," Square D Schneider Electric, brochure, 1998, 4 pages.
"Powerlogic® Series 4000 Circuit Monitor," Square D Schneider Electric, brochure, 2000, 3 pages.
"Powerlogic® System Architecture and Application Guide," Data Bulletin, Square D Schneider Electric, May 2000.

* cited by examiner

*Primary Examiner*—Anh V. La

(57) ABSTRACT

A system for determining the location of a disturbance event in a power distribution system. More specifically, the present invention provides a system for determining the direction of a disturbance event at the individual meter location and a system for analyzing this data from multiple meter locations to locate the cause of the event in the power system. The system includes a power feed bus for supplying electrical signals and a circuit monitor coupled to the feed bus. The circuit monitor is responsive to detect the disturbance event by comparing a disturbance event signal with a pre-event signal on a plurality of time scales.

34 Claims, 4 Drawing Sheets

| Voltage | 0 | 0 | 0 | 0 | 0 | 0 | 0 | 0 | 0 | + | + | + | + | + | + | + | + | + | - | - | - | - | - | - | - | - | - |
|---|---|---|---|---|---|---|---|---|---|---|---|---|---|---|---|---|---|---|---|---|---|---|---|---|---|---|---|
| Current | 0 | 0 | 0 | + | + | + | - | - | - | 0 | 0 | 0 | + | + | + | - | - | - | 0 | 0 | 0 | + | + | + | - | - | - |
| Power | 0 | + | - | + | - | 0 | - | + | 0 | 0 | + | - | 0 | + | - | 0 | + | - | 0 | + | - | 0 | + | - | 0 | + | - |
| Direction | 0 | 0 | 0 | 0 | 0 | 0 | 0 | 0 | 0 | - | - | + | - | - | 0 | + | - | + | - | + | - | + | + | - | - | 0 | - |

0 = no change
+ = increase
- = decrease

0 = indeterminate
+ = downstream
- = upstream

*FIG. 2*

| DA | Unknown | Unknown | Unknown | Unknown | Downstream | Downstream | Upstream | Upstream | Upstream | Upstream |
|---|---|---|---|---|---|---|---|---|---|---|
| DB | Unknown | Unknown | Downstream | Upstream | Downstream | Upstream | Unknown | Downstream | Unknown | Upstream |
| DC | Unknown | Downstream | Downstream | Upstream | Downstream | Downstream | Upstream | Upstream | Downstream | Upstream |
| CC | CA+CB | CA+CB | CA+CB | CA+CB | CA>=CB: CA-CB CB>CA: CB-CA | CA+CB | CA+CB | CA+CB | CA+CB | CA+CB |
| FBC | FBA | FBA | FBA | FBA | FBA | FBA | FBA | FBA | FBA | FBA |
| TBC | TBA | TBB | TBB | TBA | CA>=CB: TBA CB>CA: TBB | TBA | TBA | TBB | TBB | TBA |

*FIG. 3*

DA = DIRECTION, BRANCH A
DB = DIRECTION, BRANCH B
CA = CONFIDENCE, BRANCH A
CB = CONFIDENCE, BRANCH B

FBA = FROM BUS, BRANCH A
FBB = FROM BUS, BRANCH B
TBA = TO BUS, BRANCH A
TBB = TO BUS, BRANCH B

FBC = FROM BUS, COMBINATION
TBC = TO BUS, COMBINATION
DC = DIRECTION, COMBINATION
CC = CONFIDENCE COMBINATION

| DA | Unknown | Unknown | Unknown | Unknown | Downstream | Downstream | Upstream | Upstream | Upstream |
|---|---|---|---|---|---|---|---|---|---|
| DB | Unknown | Downstream | Upstream | Unknown | Downstream | Upstream | Unknown | Downstream | Upstream |
| DC | Unknown | Downstream | Upstream | Downstream | Downstream | CB>=CA: Downstream CA>CB: Upstream | Upstream | CB>=CA: CB - CA CA>CB: CA - CB | Upstream |
| CC | CA + CB | CA + CB | CA + CB | CA + CB | CA + CB | | CA + CB | | CA + CB |
| FBC | FBA | FBA | FBA | FBA | FBA | | FBA | FBA | FBA |
| TBC | TBA | TBB | TBB | TBA | TBB | | TBA | TBB | TBA |

*FIG. 4*

DA = DIRECTION, BRANCH A
DB = DIRECTION, BRANCH B
CA = CONFIDENCE, BRANCH A
CB = CONFIDENCE, BRANCH B

FBA = FROM BUS, BRANCH A
FBB = FROM BUS, BRANCH B
TBA = TO BUS, BRANCH A
TBB = TO BUS, BRANCH B

FBC = FROM BUS, COMBINATION
TBC = TO BUS, COMBINATION
DC = DIRECTION, COMBINATION
CC = CONFIDENCE COMBINATION

DISTURBANCE DIRECTION DETECTION IN A POWER MONITORING SYSTEM

FIELD OF THE INVENTION

This invention is directed generally to determining the location of power system disturbances in a power distribution plant by a power monitoring system. More specifically, the present invention provides a system for determining the direction of a disturbance event at the individual meter location and a system for analyzing this data from multiple meter locations to locate the cause of the event in the power system.

SUMMARY OF THE INVENTION

Briefly, a system is provided which, according to one embodiment of the present invention, examines waveform capture data on three different time scales and applies a unique scoring system to produce a direction indication and a confidence indication to a user even when the waveforms so analyzed are varying and noisy. According to another embodiment of the present invention, a system is provided for analyzing the direction and confidence data from multiple metering locations to locate the cause of the disturbance in the power system and to express confidence in that analysis.

According to a further embodiment of the present invention, a system is provided which can be used in an individual metering location in portable or permanently-installed meters. According to yet a further embodiment of the present invention, a system is provided which can be installed in software running on a personal computer in communication with metering systems in power distribution plants.

BRIEF DESCRIPTION OF THE DRAWINGS

In the drawings:

FIG. 2 is a table showing the determination of direction based on voltage, current and power changes.

FIG. 3 is a table showing an illustrative example of combining parallel branches.

FIG. 4 is a table showing an illustrative example of combining serial branches.

DETAILED DESCRIPTION OF THE ILLUSTRATED EMBODIMENT

Figure 1:
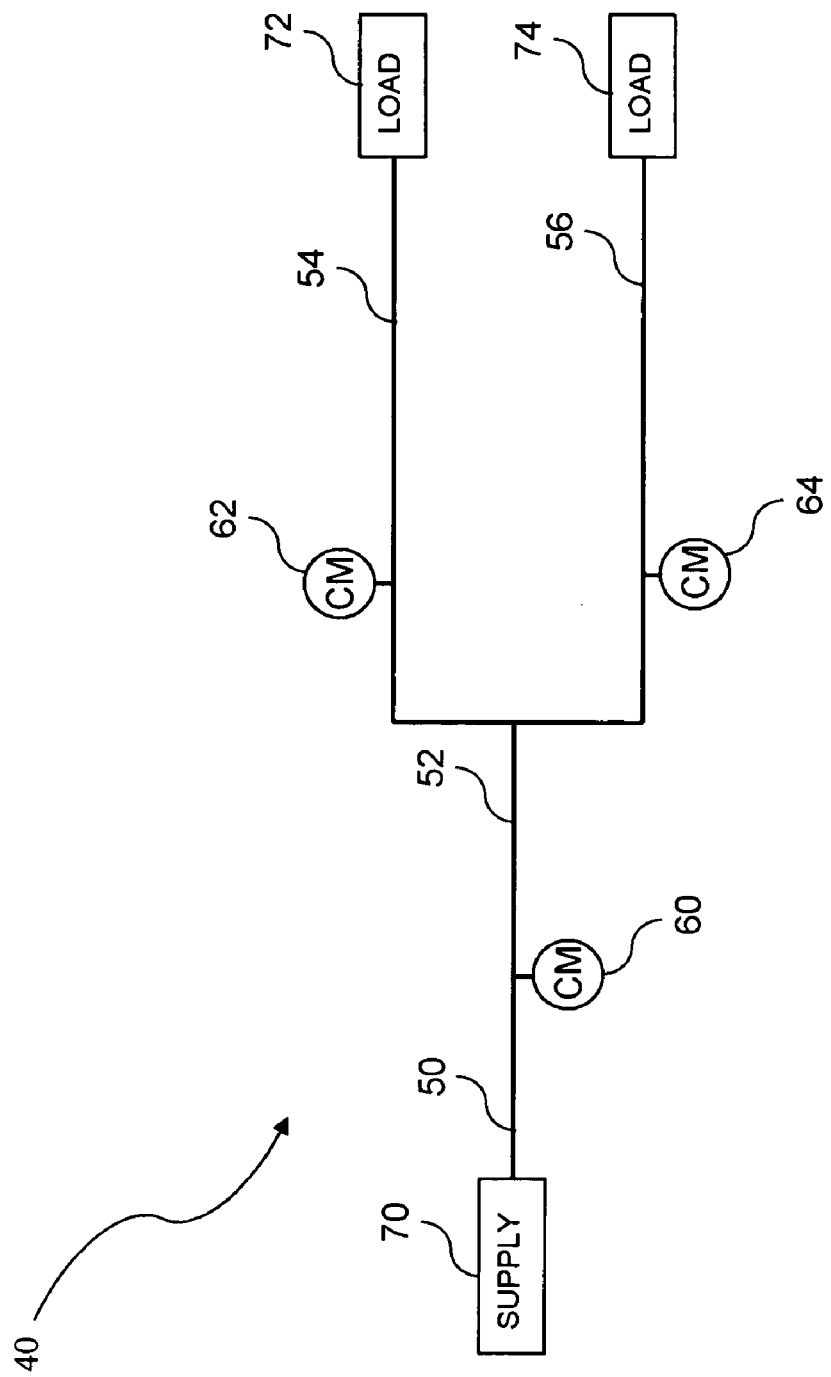
FIG. 1 is a block diagram of a radial power system as an illustrative example.

Referring now to the drawings, and initially to FIG. 1, an illustrative example of a radial power system 40 is shown. A first circuit monitor 60 is located on a power feed bus 50 of the system 40. The feed bus 50, which is monitored by the circuit monitor 60, supplies electrical current to a first branch circuit 52. The first branch circuit 52 supplies electrical current to a second branch circuit 54, which is monitored by a second circuit monitor 62, and to a third branch circuit 56, which is monitored by a third circuit monitor 64. The branch circuit 54 supplies electrical current to a first load 72, and the branch circuit 56 supplies electrical current to a second load 74.

The location, i.e., upstream or downstream, of an electrical disturbance relative to a metering location can be determined by examining the change in the voltage and current, when the event occurs, with respect to pre-event electrical waveforms. For example, if a load is energized downstream from the metering location, the meter can measure the resulting current increase and the corresponding voltage decrease and determine that the event was downstream. The techniques used for the examination of a waveform are well understood in the industry, and a discussion of some of these techniques can be found in "A Direction Finder for Power Quality Disturbances Based Upon Disturbance Power and Energy," Anthony Parsons et al., IEEE transaction on Power Deliver, Vol. 15, No. 3, July 2000, which is incorporated herein in its entirety by reference.

Circuit monitors are multifunction, digital, data acquisition devices for use in monitoring power distribution systems. One of the functions of power monitoring equipment is to capture electrical data when some set of preset electrical conditions occurs. Preset electrical conditions in power monitoring include, but are not limited to, over and under conditions of monitored voltage and/or current. When a preset condition is recognized by the power monitoring equipment, an alarm or trigger occurs resulting in visual or auditory signals, message notification, event logging or event triggers. An alarming event, used as an event trigger, can instruct the monitoring or other associated equipment to perform a series of useful tasks including waveform capture.

Power monitoring equipment is usually connected to all the power supply conductors of the electrical circuit being monitored. A channel is assigned to each conductor or a wire being monitored. Thus, load conductors are individually monitored on a dedicated channel. Preset conditions are then configured for each channel. The preset alarm conditions may be identical for all the conductors in a circuit or different. The first channel that recognizes the event and alarms, is the alarming channel.

When an alarm occurs in power monitoring equipment, a waveform capture of configurable resolution and duration can be triggered as well as other logging or notification events. Installations with multiple power monitoring equipment, may network such equipment together so that any one circuit monitor may collect data capture events from the other interconnected power monitoring equipment. Thus, one circuit monitor can provide a system-wide analysis of the disturbing event.

The metering device, e.g., the circuit monitor 60, 62, 64 of FIG. 1, is set up to trigger on the voltage channels. When a disturbance event occurs, a waveshape alarm or a sag/swell alarm is activated, which triggers a waveform capture on all monitored channels. Since the evaluation is based on changes that occur when the event occurs, the waveform capture must contain at least 3 pre-event cycles. The average of the first 2 cycles of the waveform capture is used to establish the pre-event conditions. When the waveform capture is triggered, the raw data for the entire capture is collected in a memory array. The captured data contains a variable number of cycles depending on the resolution of the waveform capture and the number of channels being recorded. Additionally, in a multiphase circuit, each of the power phases may be independently monitored and analyzed.

The analysis is based on the changes in voltage, current, and/or power when the event occurs. Under ideal conditions, with pre-event waveforms that are unchanging, the direction determination can be made easily and reliably by simply finding the point on the waveform that is different from the pre-event waveforms. However, when the waveforms are varying and noisy, the sample of pre-event waveforms is small, and/or when the magnitude of the event is small, it becomes much more difficult to locate the event in the waveform data and to correctly determine its direction.

According to one embodiment of the present invention, a unique approach is used in the circuit monitor or metering system to solve this problem. The waveform for the channel that triggered the alarm is examined on 3 time scales: (1) point-by-point, (2) window-by-window (a window being a fraction of a cycle), and (3) cycle-by-cycle.

The point-by-point analysis is performed by obtaining 16 to 512 samples from the pre-event waveform and the event portion of the waveform. Each sample is considered a point. The window-by-window analysis divides a cycle into an integer number of sets, each containing an integer number of points. Each set of points is considered a window. Windows are obtained from both the pre-event and event waveforms. The cycle-by-cycle analysis is performed on a complete electrical cycle of a pre-event waveform and a complete electrical cycle of the event waveform. According to one embodiment of the present invention, the RMS value of a pre-event cycle can be compared to the RMS value of an event cycle.

The location of the event is determined by computing the difference of the point, window and cycle under test with the reference, pre-event cycles. The difference is divided by the average difference of the two reference cycles. This ratio, which can be thought of as a signal-to-noise ratio, is then compared with setpoints for the appropriate time scale. If the setpoint is exceeded, the location of the event and coincident data on the other channels is captured for later analysis.

Turning now to FIG. 2, a scoring system is illustrated, which provides disturbance direction based on the observed changes in voltage, current and power. The central columns of FIG. 2 represent all possible combinations of "no change," "increase" or "decrease" for each channel of voltage, current and power.

Some combinations of voltage, current and power changes may appear to be invalid; however, the methodology used to construct the table uses setpoint values, or detectable levels, for each channel. For example, the second column which shows no change "0" for voltage and current, also shows an increase "+" for power. This means that while the setpoints for voltage and current did not indicate a change, the setpoint for power did indicate a change. Similarly, the first column, which indicates no change for all three channels, would not occur in the original monitor detecting the change, or the alarm monitor, but could occur in a different monitor monitoring one of the other phases in a multi-phase monitoring system.

After the event is located on one of the channels, an application of Ohm's law, as shown in FIG. 2, according to one embodiment of the present invention, is applied to the data collected to determine the disturbance direction relative to the metering or monitoring location.

Once a disturbance direction has been established, a score is determined, according to one embodiment of the present invention, which establishes the confidence that can be placed on the direction analysis. The following table, according to one embodiment of the present invention, shows how the confidence of the direction indication builds as the analysis proceeds from the alarm channel through the analysis of the other phases, all building on the basic analysis scheme presented above.

| Conditions and their effect on confidence: | |
| --- | --- |
| event detected on original, alarm channel: | 0–5 points |
| event detected on coincident channels: | 0–10 points |
| location of voltage, current and power events agree: | 0–6 points |
| ratio of min to max or max to min greater than 2: | 0–9 points |
| direction of 3-phase voltage agrees with alarm channel: | 0–5 points |
| direction of 3-phase current agrees with alarm channel: | 0–5 points |
| direction of 3-phase power agrees with alarm channel: | 0–5 points |
| Total possible number of points | 0–45 points |

When the event is detected on one channel, all three time scales (point, window and cycle) are examined and analyzed in the same fashion to see if they agree in the direction and in the location in the waveform capture. If all three agree then a value of "5" can be assigned, if only two agree then a value of "2" is assigned and if none agree then a value of "0" is assigned.

Next a confidence value of "0–10" points is added depending on the number of coincident channels that also detect the event. For the illustrative example, a value of "5" is added for only one additional channel detection and "10" is added if both channels detect the event. Thus, the relative importance of supporting evidence of coincident channel detection is clearly demonstrated.

Depending on the agreement between the channels of voltage, current and power, a value between "0" and "6" points is added to the confidence factor.

The magnitude of the event is compared to the pre-event "noise" and is also used to establish the confidence. The uncertainty comes in the inability to detect a small magnitude event in a variable "noisy" waveform. A value of "0–9" points is added to the confidence factor depending on signal-to-noise ratio.

The next steps in the analysis are to analyze the voltage, current and power for each coincident phase that is monitored in the power system. A score of "0–5" is added to the confidence factor, depending on the number of agreeing phase channels.

The final step in the analysis is to assign each event a score, which expresses the direction of the event and the confidence that can be placed on that analysis. The final score is expressed as an integer percentage of the number of points assigned. Positive values are downstream, negative values are upstream.

By collecting disturbance direction data from multiple metering locations in the power system and applying knowledge of the topology of the power system, it is possible to determine and report the location of the cause of the disturbance within the power system. This operation can be performed by a personal computer running a software program or by a circuit monitor running a custom user application program. The method described herein applies only to radial power systems. However, similar techniques could be used for other power system configurations.

Basic information describing the topology of the power system must be provided. This is accomplished by identifying significant locations (buses) in the power system and how these locations are connected (branches). Buses are represented by a bus number. Branches are represented by a branch number, a "From Bus," and a "To Bus."

The process of combining direction information from multiple metering locations in a radial power system, begins at the lowest level of the power system. Direction data for metering systems on parallel branches of the power system are combined and represented by a "virtual meter." The rules for combining parallel branches, according to one embodiment of the present invention, are shown in FIG. 3. Then, after all parallel branches at that level are combined, the remaining series branches, beginning at the lowest level are combined two at a time. The rules for combining series branches, according to one embodiment of the present invention, are shown in FIG. 4. The data reduction process continues until only one virtual metering system remains with the location of the cause of the disturbance. The resulting confidence value is then divided by the number of metering systems contributing to the confidence score.

An example is provided, using the illustrative power system 40 references of FIG. 1, of a disturbance cause at bus 54.

Step 1—Original power system definition, direction data information and confidence figures are provided in the following table.

| Branch | From Bus | To Bus | Circuit Monitor | Direction | Confidence |
|--------|----------|--------|-----------------|-----------|------------|
| 1 | 50 | 52 | CM 60 | Downstream | 50 |
| 2 | 52 | 56 | CM 64 | Downstream | 100 |
| 3 | 52 | 54 | CM 62 | Upstream | 75 |

Step 2—Next, starting at lowest level in power system, the parallel branches are combined, summing their confidence factors. In this example two power system branches remained:

| Branch | From Bus | To Bus | Circuit Monitor | Direction | Confidence |
|--------|----------|--------|-----------------|-----------|------------|
| 1 | 50 | 52 | CM 60 | Downstream | 50 |
| 2 | 52 | 54 | Virtual | Downstream | 100 + 75 = 175 |

Step 3—Finally, the branches at the lowest level in the power system are combined with the next higher level of serial branches. The analysis is complete, with only one branch left with a confidence factor of the sum of the branch confidences divided by the number of meters contributing to the confidence score:

| Branch | From Bus | To Bus | Circuit Monitor | Direction | Confidence |
|--------|----------|--------|-----------------|-----------|------------|
| 1 | 50 | 54 | Virtual | Downstream | (175 + 50)/3 = 75 |

At the user interface, according to one embodiment of the present invention, the direction can be expressed as "upstream", "downstream" or "unknown." The confidence factor, according to one embodiment of the present invention, is expressed numerically. According to yet another embodiment of the present invention, the confidence factor is expressed in terms of "high confidence" or "low confidence." In the provided example, the disturbance at Bus 56 of FIG. 1 is located "downstream" of the circuit monitor 64 with a "high confidence" factor.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system to determine the direction of a disturbance event in a power distribution system comprising:
    a power feed bus for supplying electrical signals; and
    a circuit monitor coupled to the feed bus;
    wherein said circuit monitor is responsive to detect the disturbance event by comparing a disturbance event signal with a pre-event signal on a plurality of time scales, wherein each of the plurality of time scales has a different duration.

2. The system of claim 1, wherein the plurality of time scales includes a point-by-point time scale; a window-by-window time scale; and a cycle-by-cycle time scale.

3. The system of claim 2, wherein the cycle-by-cycle time scale is the time for the signal to go through one full cycle.

4. The system of claim 3, wherein the window-by-window time scale is a predetermined portion of the cycle.

5. The system of claim 3, wherein the point-by-point time scale is an individual point of the cycle.

6. The system of claim 1, wherein the circuit monitor computes a confidence factor for the direction of the disturbance event.

7. The system of claim 1, further comprising an alarm channel for detecting a direction of a disturbance event, wherein the direction is measured for the alarm channel by the circuit monitor.

8. The system of claim 1, further comprising at least one coincident channel for detecting a direction of a disturbance event, wherein the direction is measured for at least one coincident channel by the circuit monitor.

9. The system of claim 1, wherein the direction of the disturbance event is computed by measuring a voltage disturbance, a current disturbance, and a power disturbance.

10. The system of claim 1, wherein the circuit monitor measures a signal-to-noise ratio and registers a disturbance event when the signal-to-noise ratio is greater than 2.

11. The system of claim 1, further comprising an alarm channel for measuring a direction of a disturbance event, wherein the circuit monitor measures the direction of a three-phase voltage and compares the direction of the three-phase voltage with the direction of the disturbance event as measured on the alarm channel.

12. The system of claim 1, further comprising an alarm channel for measuring a direction of a disturbance event, wherein the circuit monitor measures the direction of a three-phase current and compares the direction of the three-phase current with the direction of the disturbance event as measured on the alarm channel.

13. The system of claim 1, further comprising an alarm channel for measuring a direction of a disturbance event, wherein the circuit monitor measures the direction of a three-phase power and compares the direction of the three-phase power with the direction of the disturbance event as measured on the alarm channel.

14. A system to detect and determine the direction of a disturbance event in a power distribution system comprising:
    a power feed bus for supplying electrical signals; and
    a circuit monitor coupled to the power feed bus;
    wherein the circuit monitor determines the direction of the disturbance event and computes a confidence factor for the direction of the disturbance event.

15. The system of claim 14, wherein the confidence factor is calculated using at least one of: a detection of the disturbance event on an alarm channel; a detection of the disturbance event on at least one coincident channel; an agreement of voltage, current and power disturbance events; a signal-to-noise ratio greater than 2; the disturbance direction of a 3-phase voltage agrees with an alarm channel; said disturbance direction of a 3-phase current agrees with an alarm channel; or said disturbance direction of a 3-phase power agrees with an alarm channel.

16. A system of networked metering locations in a power distribution plant, comprising:
   a power feed bus for supplying electrical signals;
   a plurality of branch circuits, each of the plurality of branch circuits having a branch circuit circuit monitor and coupled to the power feed bus, each of said plurality of branch circuits providing electrical signals to a load; and
   wherein the branch circuit circuit monitor independently detects a disturbance event and calculates a confidence factor for the disturbance direction.

17. The system of claim 16, wherein the confidence factors of each branch circuit circuit monitor are combined to calculate a system confidence factor for the disturbance direction.

18. The system of claim 17, wherein the system confidence factor is calculated by one of the branch circuit circuit monitors.

19. The system of claim 17, further comprising a processor in communication with each of the branch circuit circuit monitors, wherein the processor combines the confidence factor of each branch circuit circuit monitor to calculate a system confidence factor.

20. The system of claim 16, wherein the power feed bus includes a power feed bus circuit monitor for independently detecting a disturbance event and calculating a confidence factor for the disturbance direction.

21. The system of claim 20, wherein the power feed bus circuit monitor receives the confidence factor from the branch circuit circuit monitor and calculates a system confidence factor.

22. The system of claim 20, wherein one of the branch circuit circuit monitors receives the confidence factor from the other branch circuit circuit monitors and the power feed bus circuit monitor and calculates a system confidence factor.

23. A method of determining the location and cause of a disturbance in an electrical power distribution plant comprising:
   detecting a disturbance event signal;
   measuring the disturbance event signal on multiple time scales, wherein each of the multiple time scales is of a different duration;
   comparing the disturbance event signal with a pre-event signal for each of the multiple time scales.

24. The method of claim 23, wherein the measuring the disturbance event comprises measuring on a point-by-point time scale; a window-by-window time scale; and a cycle-by-cycle time scale.

25. The method of claim 24, wherein the cycle-by-cycle time scale is the time for the signal to go through one full cycle.

26. The method of claim 25, wherein the window-by-window time scale is a predetermined portion of the cycle.

27. The method of claim 25, wherein the point-by-point time scale is an individual point of the cycle.

28. The method of claim 23, wherein the circuit monitor computes a confidence factor for the direction of the disturbance event.

29. The method of claim 23, wherein the measuring the disturbance event is performed by a single circuit monitor.

30. The method of claim 23, wherein the measuring the disturbance event is performed by a plurality of circuit monitors.

31. A method of detecting and determining the direction of a disturbance event in a power distribution system comprising:
   detecting a disturbance event signal;
   determining the direction of the disturbance event signal; and
   computing a confidence factor for the direction of the disturbance event signal.

32. A method of claim 31, wherein said confidence factor is calculated by measuring at least one of: a detection of said disturbance event on an alarm channel; a detection of said disturbance event on at least one coincident channel; an agreement of voltage, current and power disturbance events; a signal-to-noise ratio greater than 2; a disturbance direction of a 3-phase voltage agrees with an alarm channel; a disturbance direction of a 3-phase current agrees with an alarm channel; or a disturbance direction of a 3-phase power agrees with an alarm channel.

33. The method of claim 31, further comprising combining the confidence factors from a plurality of networked metering locations in the power distribution system and expressing a confidence in that analysis.

34. The method of claim 33, wherein said confidence factor is calculated by measuring at least one of: a detection of said disturbance event on an alarm channel; a detection of said disturbance event on at least one coincident channel; an agreement of voltage, current and power disturbance events; a signal-to-noise ratio greater than 2; a disturbance direction of a 3-phase voltage agrees with an alarm channel; a disturbance direction of a 3-phase current agrees with an alarm channel; or a disturbance direction of a 3-phase power agrees with an alarm channel.

* * * * *